(12) United States Patent
Mascarenhas

(10) Patent No.: US 6,808,393 B2
(45) Date of Patent: Oct. 26, 2004

(54) INTERACTIVE ASSESSMENT TOOL

(75) Inventor: Desmond D. Mascarenhas, Los Altos Hills, CA (US)

(73) Assignee: Protigen, Inc., Sunnyvale, CA (US)

( * ) Notice: Subject to any disclaimer, the term of this patent is extended or adjusted under 35 U.S.C. 154(b) by 0 days.

(21) Appl. No.: 09/990,655

(22) Filed: Nov. 21, 2001

(65) Prior Publication Data

US 2002/0133493 A1 Sep. 19, 2002

Related U.S. Application Data

(60) Provisional application No. 60/252,868, filed on Nov. 21, 2000.

(51) Int. Cl.$^7$ ................................................ G09B 3/00
(52) U.S. Cl. ....................... 434/322; 434/118; 434/350; 434/236
(58) Field of Search ................................ 434/322, 350, 434/118, 323, 236; 706/927

(56) References Cited

U.S. PATENT DOCUMENTS

| | | | |
|---|---|---|---|
| 5,051,932 A | | 9/1991 | Inoue et al. |
| 5,122,952 A | | 6/1992 | Minkus |
| 5,456,607 A | * | 10/1995 | Antoniak .................... 434/323 |
| 5,788,502 A | * | 8/1998 | Shea ........................... 434/157 |
| 5,879,165 A | * | 3/1999 | Brunkow et al. ........... 434/322 |
| 5,890,152 A | | 3/1999 | Rapaport et al. |
| 5,899,995 A | | 5/1999 | Millier et al. |
| 6,029,195 A | | 2/2000 | Herz |
| 6,042,384 A | * | 3/2000 | Loiacono ..................... 434/322 |
| 6,052,512 A | | 4/2000 | Peterson et al. |
| 6,077,085 A | * | 6/2000 | Parry et al. ................. 434/322 |
| 6,086,382 A | * | 7/2000 | Thomas ....................... 434/323 |
| 6,112,186 A | | 8/2000 | Bergh et al. |
| 6,186,794 B1 | * | 2/2001 | Brown et al. ............... 434/116 |
| 6,285,993 B1 | * | 9/2001 | Ferrell .......................... 706/45 |
| 6,386,883 B2 | * | 5/2002 | Siefert ......................... 434/322 |

* cited by examiner

*Primary Examiner*—Teresa Walberg
*Assistant Examiner*—Cameron Saadat
(74) *Attorney, Agent, or Firm*—Morrison & Foerster LLP

(57) ABSTRACT

The present invention provides a method, system, and computer product to evaluate a user's learning style. The user is presented with a series of interactive assessment exercises, wherein each exercise contains one or more clues, a number of correct cards, and a number of incorrect cards. The user's responses, which include the types and number of moves made, the time it takes to select another card, and the like are received, recorded, or captured. Based on the user's responses, the responses are evaluated and used in a learning style formula to determine the learning style of a user. The invention also provides for a method, system, and computer product that evaluate a user's comprehension of a certain topic or subject matter. The user is presented with an interactive assessment exercise, wherein such exercise contains one or more clues, a number of correct cards, and a number of incorrect cards.

5 Claims, 10 Drawing Sheets

BioCritique
*Forum for the Biomedical Professional*

>> View Reference in Cardiovascular Forum

FORUM | LIST | POST | STAFF | ADMIN | LOGO

ABSTRACT
AUTHOR LINK
RELATED ARTICLES
CLINICAL GUIDELINES
CLINICAL TRIALS

⇨ Download Article

⇨ Download Files

📄 Earn Biocredits

🎩 Drug & Company Info

TITLE: Renoprotective effect of the angiotensin-receptor antagonist irbesartan in patients with nephropathy due to type 2 diabetes.

AUTHORS: Lewis EJ, Hunsicker LG, Clarke WR, Berl T, Phol MA, Lewis JB, Ritz E, Atkins RC, Rohde R, Raz I

CITATION: N Engl J Med 2001 Sep 20;345(12):851-60.

SUBMITTED: Posted on 10-Oct-01

USER RATING: 5.0 (Number of Votes: 1)

CRITIQUES: Posted on Wed, Oct 10 2001: [Edit] [Delete]
This study, focusing on the effects of an angiotensin receptor-blocker (ARB), irbesartan (300 mg/day) on patients with type II diabetes mellitus, hypertension and proteinuria found a significant benefit in slowing the rate of progression of renal disease compared to amlodipine (10mg/day) or placebo.
There were no significant differences in the secondary endpoint, composite cardiovascular events or in total mortality, although the trial was not well

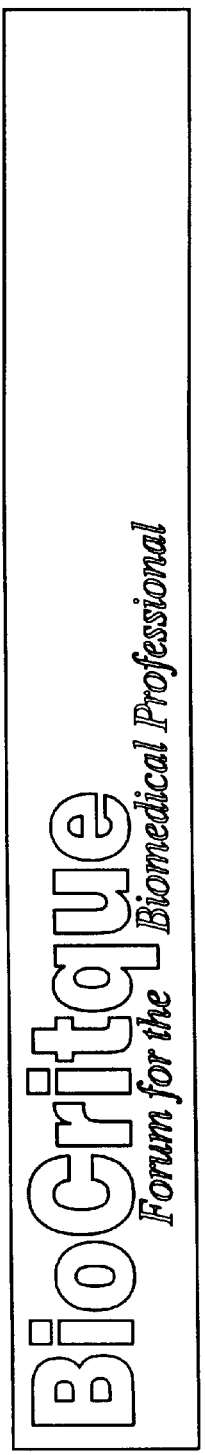
>> Pick Assessment
*Earn Biocredits*
TITLE: Renoprotective effect of the angiotensin-receptor antagonist irbesartan in patients with nephropathy due to type 2 diabetes.
CITATION: N Engl J Med 2001 Sep 20;345(12):851-60.
The assessment module should have opened in a new window. When you are finished
Fig. 12

Fig. 13

TITLE: Renoprotective effect of the angiotensin-receptor antagonist irbesartan in patients with nephropathy due to type 2 diabetes.
CITATION: N Engl J Med 2001 Sep 20;345(12):851-60.

1. Enter name of assessment for future reference.

2. Enter keywords or phrases.
Keyword 1    Keyword 2    Keyword 3    Keyword 4
Keyword 5    Keyword 6    Keyword 7    Keyword 8
Keyword 9    Keyword 10   Keyword 11   Keyword 12
Keyword 13   Keyword 14   Keyword 15   Keyword 16

3. Enter clues.
Clue for session 1
Clue for session 2
Clue for session 3

4. Enter answers.
Answers for session 1  Please Select  Please Select  Please Select  Please Select
Answers for session 2  Please Select  Please Select  Please Select  Please Select
Answers for session 3  Please Select  Please Select  Please Select  Please Select Create

INTERACTIVE ASSESSMENT TOOL

RELATED APPLICATIONS

This application claims priority from U.S. Provisional Application No. 60/252,868, filed Nov. 21, 2000, titled "Interactive Assessment Tool" which is incorporated fully herein by reference.

BACKGROUND OF THE INVENTION

1. Field of the Invention

This invention relates generally to a computer-implemented assessment tool and more specifically to a system and method for automated testing and learning, and automated performance evaluation of a user's comprehension of a given subject matter and user's cognitive and learning style.

2. Description of the Related Art

Evaluating an individual's comprehension of a subject matter is, or should be, part of every organized educational process. Students are tested on comprehension of subject matters through tests, such as standardized tests (e.g., SAT, GMAT, ACT, and LSAT), single-application tests given in classroom settings, and the like. The number of correct answers obtained by a student typically correlates to the student's level of comprehension.

Computer-implemented tests are also available to enhance learning. Interactive software applications are available, which provide a user, for example, a series of multiple choice questions. Feedbacks on the number of correct answers and possible explanation why a certain multiple choice is the best answer are also presented to the user.

Games have also been used to educate people, as can be seen with the proliferation of educational games available in the market today. For example, computer-implemented games that teach young children math or reading skills are available. Games assisting children and even adults on how to use the keyboard or improve their typing skills are also available in the market today.

Currently, there is a constant demand for tools that assist educators to efficiently and quickly deploy teaching materials for use by individuals, whether this is in a game environment or in a test-like environment. In particular there is a need for scaleable online systems wherein the data collected from an individual user can be analyzed by a computer system in real time and used to drive logical presentation of content to that user. In particular, the presentation of content formatted in different ways should be optimized to each user's preferred cognitive style, or learning style, in order to increase the effectiveness of the educational experience.

A related challenge pertaining both to scaleable learning systems and to real time customization of content in online learning, is the development of assessment systems that are simple and straightforward enough in their implementation to allow widespread use by educators (in creating the assessments) who may have limited computer savvy, can accurately measure conceptual understandings, can compute performance online efficiently and in real time, and can use the results of these computations to drive decisions on what content options to present to each user. It is important, in this context, to distinguish between 'linear' and 'conceptual' assessment tools. Multiple-choice formats (the most common online assessment formats at the present time) are severely limited in that they tend to measure 'linear' understandings. The present invention provides methods, computer products and a computer apparatus for implementing assessments that measure deeper relational, or conceptual, understandings.

Psychologists have determined that many factors contribute to the way people learn. Classifications of various learning styles have also been proposed. Gregorc, a well-known investigator in this field, has described four types of learning styles. Table I below shows four classifications adapted from Gregorc: traditional, intuitive, administrative, and investigative.

TABLE I

Four Classifications of Learning Styles (adapted from Gregorc)

|  | Concrete | Abstract |
| --- | --- | --- |
| Formal | Concrete Formal (Traditional) | Abstract Formal (Administrative) |
| Open-Ended | Concrete Open-Ended (Intuitive) | Abstract Open-Ended (Investigative) |

A person who falls under the "concrete" column is generally detail-oriented. One who falls under the "abstract" column is generally conceptual, that is, typically learns by analogy and by understanding the "big picture." One who falls under the "formal" column tends to be rule-based and understands a subject matter by understanding rules. One who falls under the "open-ended" column unlike the "formal" type tends to accept rules conditionally.

Determining a person's learning style is important in enabling educators to present information or content in a manner best suited to that person. Determining a person's learning style, however, takes time and may involve several types of evaluations and analyses.

U.S. Pat. No. 5,122,952, issued to Minkus, describes a method and apparatus for automated learning tool selection for child development. In this invention, a number of available products, such as toys, games, books, and the like, are analyzed and the product data collected are entered into a computer system. A questionnaire regarding the child is then filled out and analyzed. The child data collected from the questionnaire, which may include preferences and skill level information, are also entered into the system. The child data is then matched against the product data and a list of products matching the characteristics of the child is produced. The system described in the above-mentioned patent, however, may be time and resource consuming. A simple and fast way to determine an individual's learning style is thus highly desirable.

From the discussion above, it is apparent that there is a need for a system or method to easily deploy or make available assessment materials, whether they be in a test or game environment, as well as a way to easily determine a person's learning style. In addition, a tool that easily measures a person's comprehension of a given subject matter is also needed. The present invention fulfills this need.

SUMMARY OF THE INVENTION

The present invention provides a method of evaluating a user's learning style. The user is presented with a series or a number of interactive assessment exercises, wherein each exercise contains one or more clues, a number of correct cards, and a number of incorrect cards. The user's responses, which include the types and number of moves made, time it takes to select another card, and the like, are received, recorded, or captured. The user's responses are then evaluated and used in a learning style formula to determine the learning style of that user. More specifically, the present invention provides a computer-implemented method for evaluating a user's learning style through a specific series of steps. These steps include presenting one or more interactive assessment exercises to a user wherein each interactive assessment exercise displays a global objective or clue, a number of correct cards displaying distinct textual or graphical content, and a number of incorrect cards displaying distinct textual or graphical content, wherein a relationship of content displayed on the cards to the global objective or clue is stronger for correct cards than for incorrect cards and wherein the number of incorrect cards is greater than the number of correct cards, collecting responses from a user and evaluating the user's learning style based on the responses collected from the user. For example, a user's learning style may be derived from a computation of percentage thinking time and/or search linearity.

In another aspect of the invention, the invention provides for a method of evaluating a user's comprehension of a certain topic or subject matter. The user is presented with an interactive assessment exercise, wherein such exercise contains one or more clues, a number of correct cards, and a number of incorrect cards. The user's responses, which include the number of moves and the time it takes to successfully complete the game, are received, recorded or captured. The user's responses are then evaluated and used to determine the user's comprehension based on the number of moves made and the time it takes to complete the game successfully. More specifically, the present invention provides a computer-implemented method for evaluating a user's comprehension of content by presenting one or more interactive assessment exercises to a user, collecting responses from the user and evaluating the user's comprehension of content based on a computation of percentage correct moves and/or test response time.

The present invention also provides for systems, which provide the functions and features described above. The present invention also provides for computer software products or an apparatus that provides the functions and features described above. More specifically, the present invention provides for an apparatus for evaluating a user's learning style, comprising (a) a computer having a server mechanism installed therein for receiving responses from a user, the user supplying responses from a client computer; the server mechanism containing a first logic device for transmitting to the client computer, a plurality of interactive assessment exercises for presentation to the user wherein each interactive assessment exercise displays a global objective or clue, a number of correct cards displaying distinct textual or graphical content, and a number of incorrect cards displaying distinct textual or graphical content, wherein a relationship of content displayed on said cards to said global objective or clue is stronger for correct cards than for incorrect cards and wherein the number of incorrect cards is greater than the number of correct cards (b) the server mechanism containing a second logic device for receiving data from the client computer which represent responses from said user from said plurality of interactive assessment exercises; and (c) a third logic device coupled to the second logic device for evaluating said user's learning style based on said received responses from said user.

Considering that users at one time or another have played with cards, the interface of using cards to evaluate a user's comprehension and learning style is simple and fun to use. In addition, the invention is very useful because a person's learning style is quickly evaluated by just taking a number of interactive assessment exercises.

Other features and advantages of the present invention should be apparent from the following description of the preferred embodiment, which illustrates, by way of example, the principles of the invention.

BRIEF DESCRIPTION OF THE DRAWINGS

FIG. 7 illustrates typical access to the assessment tool as a resource from any page containing relevant content.

FIG. 10 illustrates the responses to user clicks.

FIG. 11 illustrates re-use of word cards in subsequent iterations of the module.

FIG. 12 illustrates typical navigational options when the assessment is completed and the module window closes.

FIG. 13 illustrates the creation of an assessment module.

DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
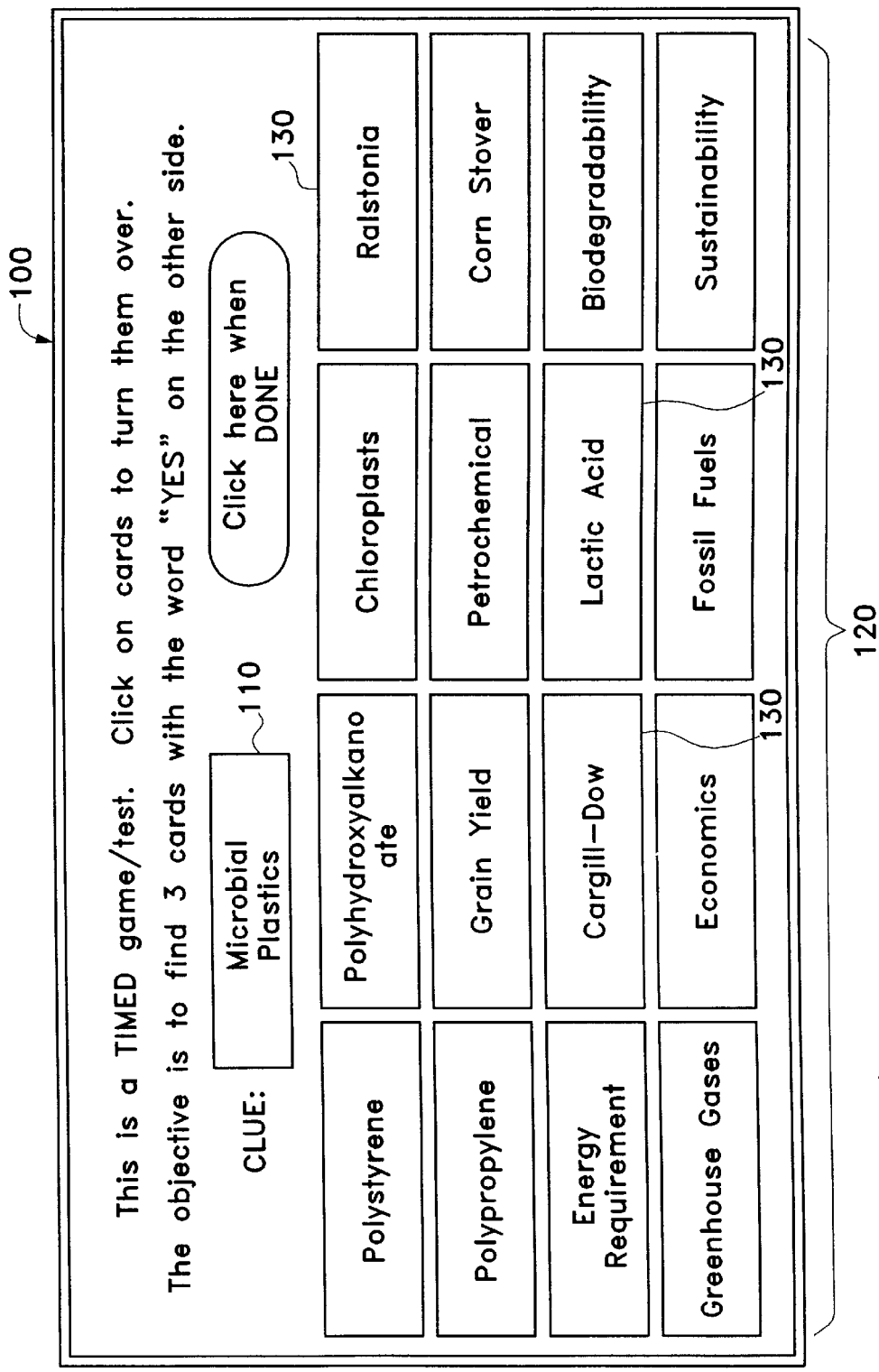
FIG. 1 is a block diagram representation of an embodiment of an interactive assessment tool or exercise constructed in accordance with the present invention.

FIG. 1 illustrates an interactive assessment tool or exercise constructed in accordance with the present invention that is simple and a fin way to evaluate a user's comprehension of a certain subject matter and to evaluate a user's learning style. In this embodiment, an educator needs to only provide one or more clues, three correct cards, and thirteen incorrect cards. A card may contain one or more keywords, phrases, sentences, images, symbols, audio clips, video clips, combinations thereof, and the like. Variations on the number of correct and/or incorrect cards and the number and types of clues are also covered in this invention. For the purposes of this invention, "card" refers to a discrete informational item or space within a displayed array of such items or spaces, wherein the selection of the card by clicking it or "turning it over" leads to a displayed effect or result.

Referring to FIG. 1, the interactive assessment tool or exercise is presented via a graphical user interface or window 100. The exercise may be in a test-like or game-like environment. In this embodiment, a clue, "Microbial plastics" 110, and sixteen cards 120 are presented to the user. The three correct cards 130 are "Cargill-Dow," "Lactic Acid," and "Ralstonia." The other thirteen incorrect cards, labeled "Polystyrene," "Polyhydroxyalkanoate," "Chloroplasts," "Polypropylene," "Grain Yield," "Petrochemical," "Corn Stover," "Energy Requirement," "Biodegradability," "Greenhouse Gases," "Economics," "Fossil Fuels," and "Sustainability," are also presented to the user. The exercise is timed. In one embodiment, if a user does not respond within the allotted time, the user is deemed to have selected an incorrect card.

To use the tool, the user reads the clue(s), clicks on the three cards that the user thinks are best associated with the clue, and continues on by clicking more cards until the user is informed that all the correct cards have been selected, i.e., the exercise has been completed successfully. Clicking a card results in the card being turned over and the backside of the card displaying a "Yes" or a "No" depending on whether the card selected is correct. A card that displays a "Yes" indicates that the user has selected a correct card.

A user's comprehension is usually evaluated based on the user's responses, such as the total number of moves and the time it takes to complete the exercise successfully. If the user selected all three correct cards in three moves, that equates to complete comprehension by the user, i.e., a perfect score is achieved. A user moves by clicking on a card.

Figure 2:
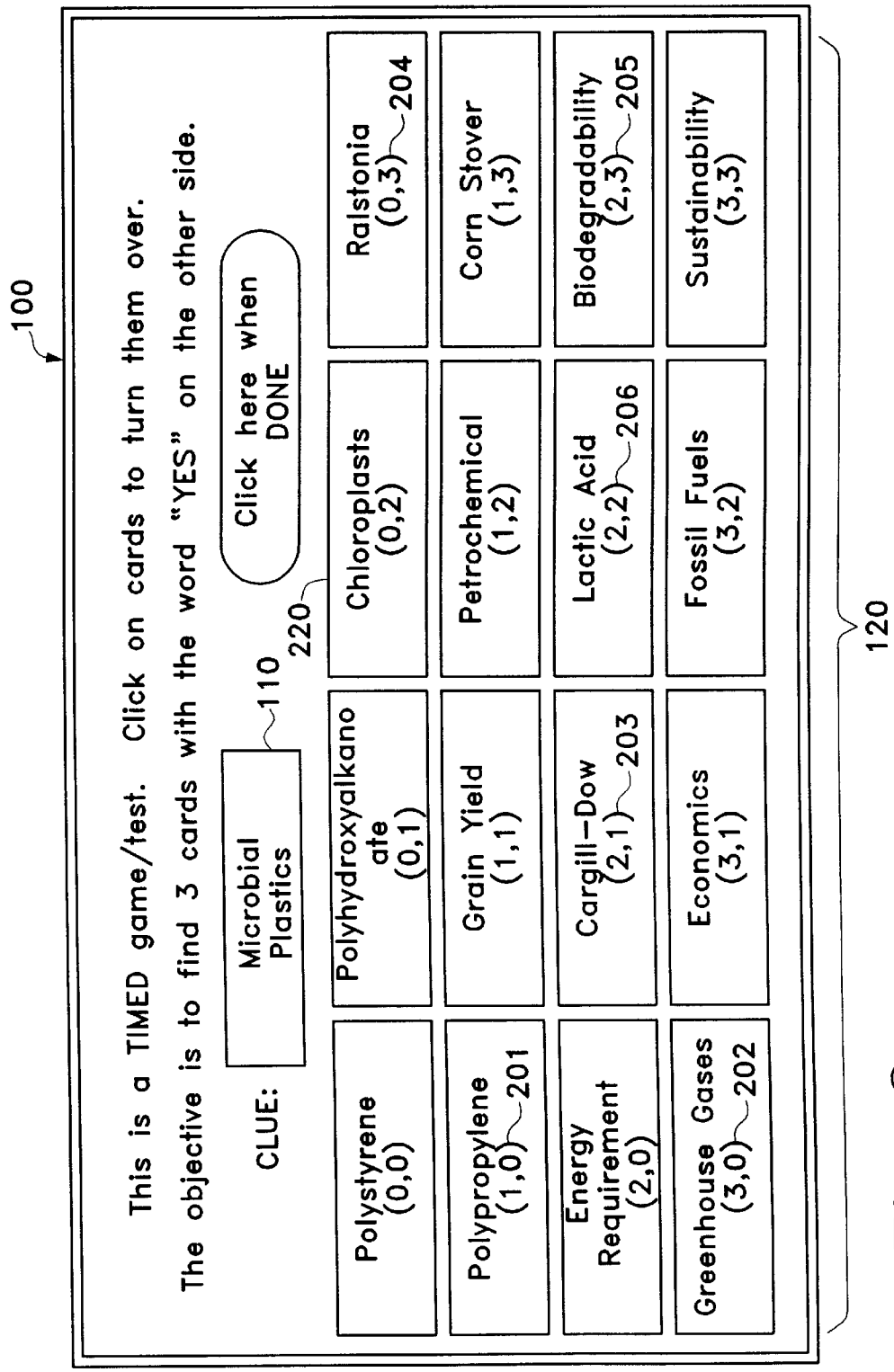
FIG. 2 is a block diagram representation of an embodiment of FIG. 1 showing the position of each card, cards selected, and order of selection by an exemplary user.

FIG. 2 is similar to FIG. 1, except that the position of each card is indicated by X and Y coordinates. In this case, for example, the position of "Chloroplasts" 220 is indicated by "(0,2)" (X=0, Y=2). The order of moves is also shown and labeled with arrows 201, 202, 203, 204, 205, and 206, which show the first, second, third, fourth, fifth, and sixth card selected, respectively.

To evaluate the user's learning style, the user's responses are recorded. The system monitors the starting position, the number of linear moves, the number of semi-linear moves, the number of non-linear moves, the total time, the thinking time, and the percentage of thinking time. The starting position is the first card selected. A linear move is a move that results in one coordinate remaining the same between consecutive moves or card selections. A semi-linear move is a move that results in both coordinates changing by one between consecutive moves. A non-linear move is a move that results in both coordinates changing between consecutive moves and at least one of such coordinates changing by more than one. The total time is the total time taken by the user to successfully complete an exercise. The thinking time is the sum of all times in excess of two seconds taken on a move. The percentage of thinking time is thinking time over total time (thinking time/total time).

In another embodiment of the invention, search linearity and search non-linearity are also calculated when the total number of moves is greater than five moves. Search linearity is the number of linear moves over sixteen (number of linear moves/16) or over the total number of cards presented to the user, including correct and incorrect cards. Search non-linearity is the number of non-linear moves over the total number of moves to successfully complete the exercise (number of non-linear moves/total moves).

Referring to FIG. 2, assuming that "Polypropylene" 201 with position "(1,0)" is the first card selected by the user, the position "(1,0)" is considered the starting position. If the user then clicks on "Greenhouse Gases" 202 with position "(3,0)," the user executed a linear move because the Y-coordinate, "0," is the same from the previous position. If the user then clicks on "Cargill-Dow" 203 with position "(2,1)," the user executed a semi-linear move because both X and Y coordinates changed by one from the previous position (from "(3,0)" to "(2,1)"). A non-linear move is then made when the user clicks on "Ralstonia" 204 with position "(0,3)" because both coordinates changed and at least one of the coordinates changed by more than one from the previous position (from "(2,1) to "(0,3)"). A linear move is then made when the user clicks on "Biodegradability" 205 with position "(2,3)". Another linear move is also made when the user next clicks "Lactic Acid" 206 with position "(2,2)."

To determine a user's learning style, a series or a number of exercises may have to be done by the user covering various contents, e.g., a dozen exercises. The user's learning style is based on the percentage of thinking time and search linearity calculated over a number of exercises, over varied content, by the same user. Thinking time is the aggregate time spent between moves (minus a fixed baseline, such as 2 seconds per move). Percentage thinking time is thinking time as a percentage of total time. Search linearity is calculated by dividing the number of linear moves by the total number of moves. Population means for percent thinking time and linearity are calculated based on multiple responses collected for all assessment exercises, for example, from several hundred users. Population means for number of moves and total time are calculated based on multiple responses collected for each assessment exercise, for example, from several hundred users. Each user's scores in each of these parameters (such as thinking time and search linearity) are then normalized and fitted to a population distribution. "High" scores are above the median value, while "Low" scores are below the median value.

For example, if a user took 12 moves and 30 seconds to reach a successful conclusion to the test (e.g. finding three correct cards out of a possible sixteen), 6 of the moves made by the user were linear, and 6 seconds elapsed as 'thinking time', then Number of moves=12

Total time=30 seconds

Linearity is 6/12=50%

Percent thinking time is 6/30=20%.

The first two parameters are used to score comprehension. The last two parameters are used to compute learning style.

There is currently no other known method for reliable, real-time, online computation of a user's learning style that can drive real-time selection of presentation format optimized to each user. It has been estimated that learning outcomes can be improved by 25% or higher through such format optimization protocols.

Table II illustrates the criteria based on which a user may be classified under the learning styles shown in Table I. Other similar classifications may also be used in accordance with the present invention.

TABLE II

Criteria for the Four Different Learning Styles

| Learning Style | Criteria |
| --- | --- |
| Concrete Formal (Traditional) | High Linearity, Low Percentage of Thinking Time |
| Abstract Formal (Administrative) | High Linearity, High Percentage of Thinking Time |
| Concrete Open-Ended (Intuitive) | Low Linearity, Low Percentage of Thinking Time |
| Abstract Open-Ended (Investigative) | Low Linearity, High Percentage of Thinking Time |

For instance, if two users provided input such that one had 11.2% thinking time and the other had 33.5% thinking time, and the population mean for percent thinking time was found to be 24% (as an example), then the first user would be 'Low' and the second user would be 'High' with respect to percent thinking time.

Figure 3:
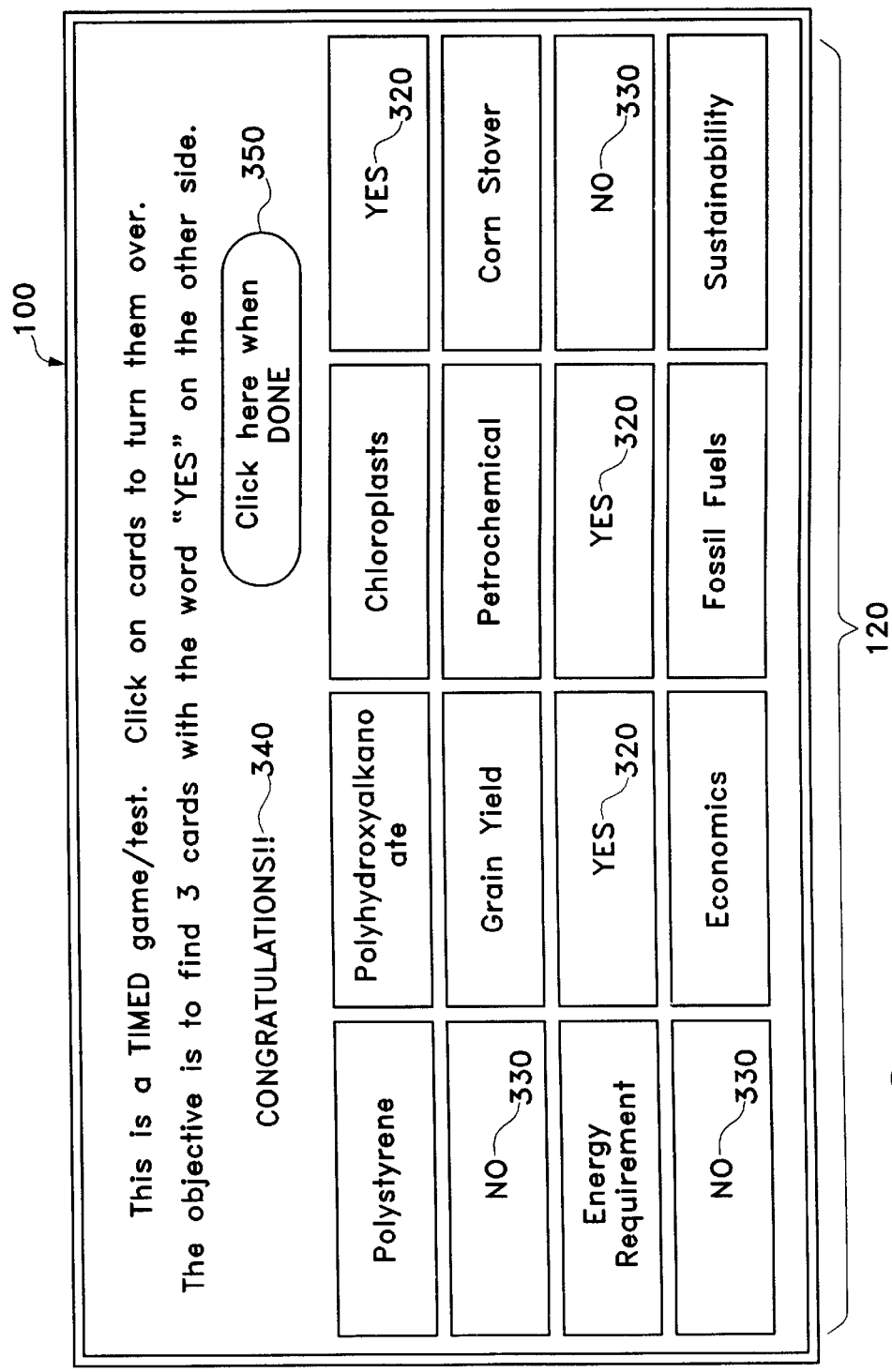
FIG. 3 is a block diagram representation of an embodiment of FIG. 1 showing how the interactive assessment tool may be presented after the user has successfully completed the exercise.

FIG. 3 is a graphical presentation of the interactive assessment tool showing how FIG. 1 representation may be changed after the user has selected all correct cards. "Congratulations" 340 indicates that the user has completed the exercise successfully. Variations on when the cards are turned over will depend on system design and implementation. For example, a card is automatically turned over once a user clicks on it. Another embodiment may involve a user selecting the minimum number of cards needed to complete the game successfully and hitting the "Click here when DONE" button 350 after selection. Only when this button is clicked will the cards be turned over.

FIG. 3 illustrates the window 100 showing that the exercise has been completed successfully, i.e., the three correct cards 320, shown with "YES" have been selected. The incorrect cards 330 clicked on by the user, shown with "NO," are also displayed. Variations on how the window 100 is presented are dependent on system implementation and design.

The display of these same cards (shown as 120 in FIG. 1) may also be used in another exercise just by changing the clue and ensuring that the correct cards are included. For example, to provide another exercise, an educator needs to change the clue to read "Teaching plant cells to make plastic," and needs to ensure that the correct cards (which are "Chloroplasts," "Corn Stover," and "Polyhydroxyalkanoate") are included. Another example is by changing the clue to read "Problems with making plastics in plants" and ensuring the correct cards (which are "Economics," "Energy Requirement," and "Greenhouse Gases") are included.

Figure 4:
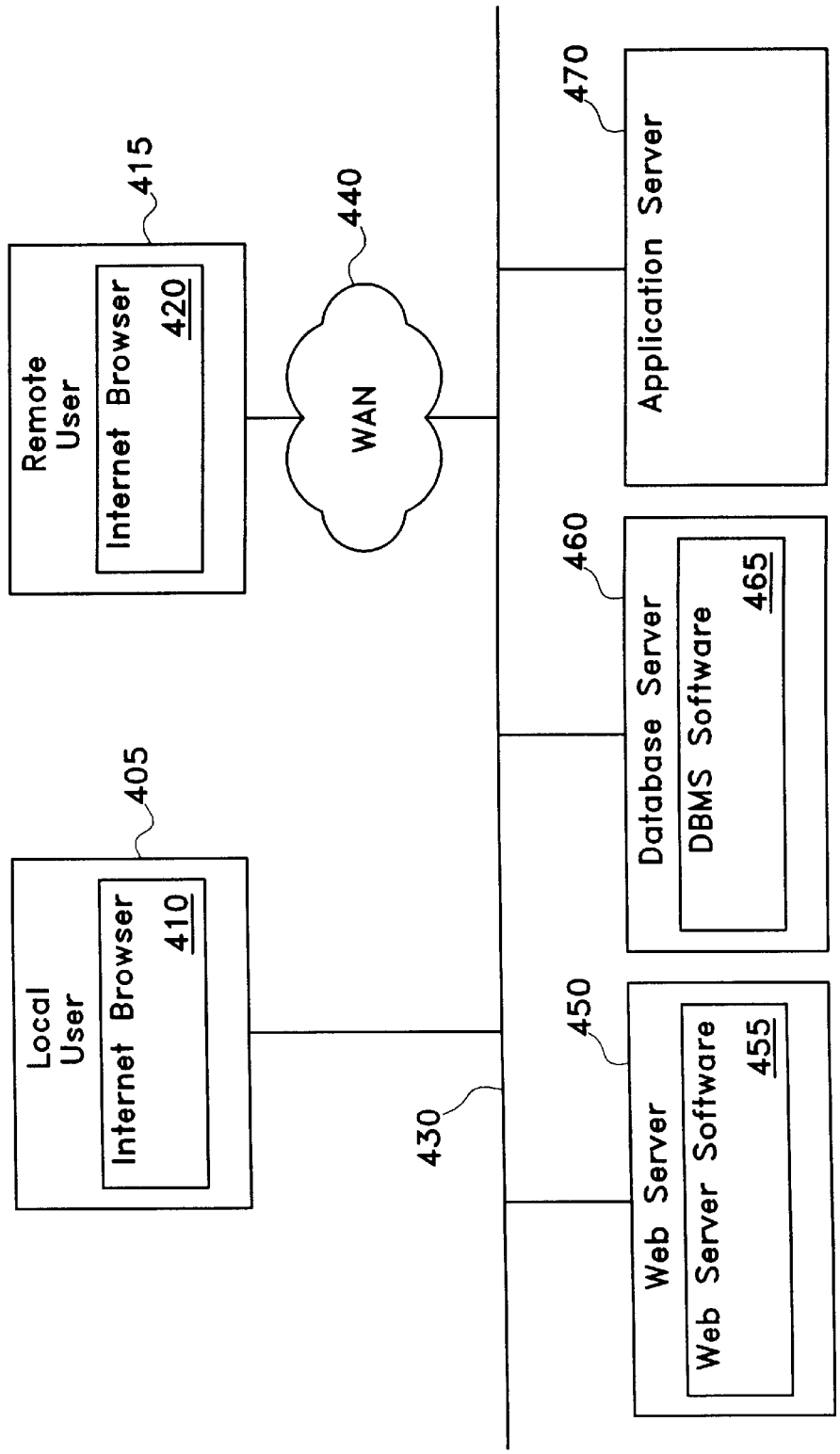
FIG. 4 is an embodiment of the invention implemented over a data network constructed in accordance with the present invention.

FIG. 4 is an embodiment of the invention implemented over a data network constructed in accordance with the present invention. The interactive assessment tool, for example, as shown in FIG. 1, may be dynamically generated from the following inputs: one or more clues, correct cards, and incorrect cards. In one embodiment, such interactive assessment tool is written in Java. As stated above, the tool has two features, that is, to measure the user's comprehension of a certain topic and to determine the user's learning or cognitive style.

In this embodiment, the system includes a conventional Internet or Intranet Web server 450 that is capable of sending Web pages and processing scripts, a database server 460 that stores and handles database manipulation and updates, and an application server 470 that contains and which may execute the logic embodying the features of the present invention, e.g., storing the Java code. The functions of servers 450, 460, and 470 may also be incorporated into one or more servers.

A user at a computer (local user 405 or remote user 415, respectively) employs typically a computer containing an Internet browser software 410, 420 (or an Internet-enabled appliance) to access and connect to the Web server 450, database server 460, and application server 470.

The Web server 450, database server 460, and application server 470 are connected to a data network, such as a local area network 430 which may also be connected to the Internet through a wide area network (WAN) 440. The Web server is a device, typically a computer, which contains a Web server software 455. MICROSOFT® INTERNET INFORMATION SERVER is an example of a Web server software.

The database server 460 is a device, typically a computer, which contains a database management system (DBMS) software 465, as well as the data used and/or manipulated in the present invention. Microsoft® SQL Server and Oracle's DBMS products are examples of DBMS software.

The application sever 470 is a device, typically a computer, which contains certain application software, such as the Java Code needed to deploy the interactive assessment tool, for example, as shown in FIGS. 1 to 3.

The invention may also be implemented in a single computer. Variations on how the interactive assessment tool may be deployed, as well as various configurations, are well known in the art.

Figure 5:
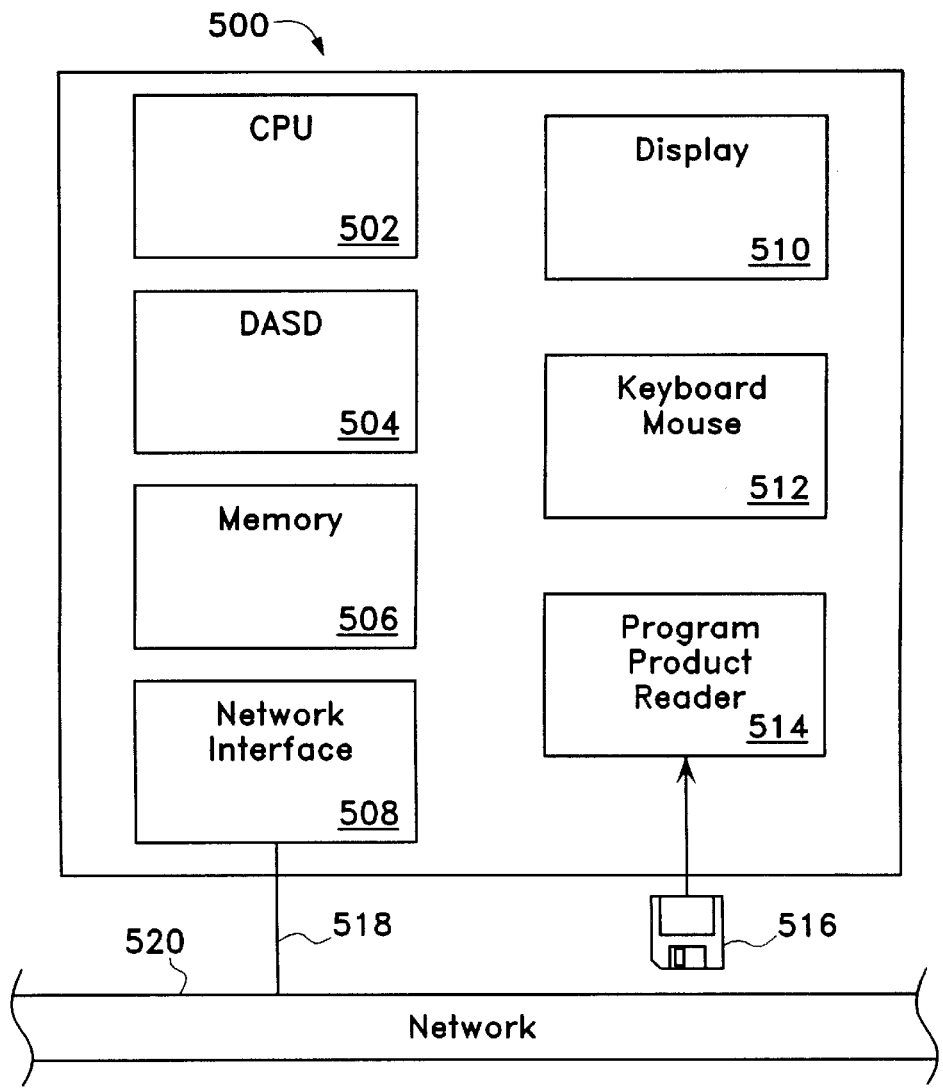
FIG. 5 illustrates a block diagram representation of one of the computers in the system illustrated in FIG. 4.

FIG. 5 is a block diagram of an exemplary computer 500 such as might comprise any of the servers or computers in FIG. 4. Each computer 500 operates under control of a central processor unit (CPU) 502, such as a "Pentium" microprocessor and associated integrated circuit chips, available from Intel Corporation of Santa Clara, Calif., USA. A computer user can input commands and data from a keyboard and mouse 512 and can view inputs and computer output at a display 510. The display is typically a video monitor or flat panel display device. The computer 500 also includes a direct access storage device (DASD) 504, such as a fixed hard disk drive. The memory 506 typically comprises volatile semiconductor random access memory (RAM). Each computer preferably includes a program product reader 514 that accepts a program product storage device 516, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, DVD disk, or the like. Each computer 500 can communicate with the other connected computers over the network 520 through a network interface 508 that enables communication over a connection 518 between the network and the computer.

The CPU 502 operates under control of programming steps that are temporarily stored in the memory 506 of the computer 500. When the programming steps are executed, the pertinent system component performs its functions. Thus, the programming steps implement the functionality of the system as described herein this application. The programming steps can be received from the DASD 504, through the program product 516, or through the network connection 518. The storage drive 504 can receive a program product, read programming steps recorded thereon, and transfer the programming steps into the memory 506 for execution by the CPU 502. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 506 over the network 518. In the network method, the computer receives data including program steps into the memory 506 through the network interface 508 after network communication has been established over the network connection 518 by well-known methods that will be understood by those skilled in the art without further explanation. The program steps are then executed by the CPU 502 to implement the processing and features of the present invention.

It should be understood that all of the computers of the systems illustrated in FIG. 4 preferably have a construction similar to that shown in FIG. 5, so that details described with respect to the FIG. 5 computer 500 will be understood to apply to all computers of the systems in FIG. 4. Any of the computers can have an alternative construction, so long as they can support the functionality described herein.

A protocol-based perspective of this system is provided in the following example: An assessment module consists of a set of 16 keywords or phrases, a set of three clues, and one set of three solution keywords for each clue. When an assessment module is begun, the user is presented with three sessions in sequence. Each session presents the user with one of the clues, and a grid containing the 16 keywords. The user is prompted to click the three solution keywords for the given clue. The assessment module indicates whether or not each keyword choice was correct. When the three solution keywords have been chosen, the next session in the series is presented until the assessment module has been completed. For each session of an assessment module, the following sequence of events occurs:

1. A Java applet is opened in a browser window and is parameterized with the following data:
   a. Database key of assessment module data.
   b. Database key of user account.
   c. Session number.
2. The Java applet queries the web site over HTTP; the web site retrieves data from database and returns keywords, clue, and solution data for the requested session of the requested assessment module.
3. The Java applet presents user with keywords and clue; user completes session as described above.
4. When the session is complete, data about the session is sent to the web site over HTTP, and stored for the user account provided. The following data is sent:
   a. The number of keyword choices made by the user before all three correct keywords were chosen.
   b. The series of choices made by the user, expressed as (x,y) coordinates.
   c. The times the choices were made, expressed in milliseconds from the start of the session.
5. The next session is presented, or the user is informed that the assessment module is complete.

Figure 6:
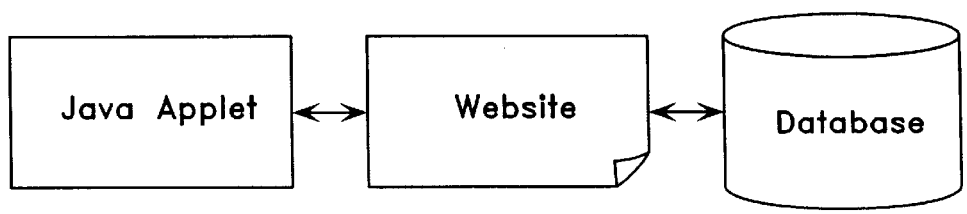
FIG. 6 illustrates a schematic of protocols used in a typical implementation in accordance with the present invention.

A schematic of the above example logic is shown in FIG. 6.

A specific user-interface (UI) example of the steps involved in using the assessment module of this invention is illustrated in FIGS. 7 through 13.

FIG. 7 illustrates typical access to the assessment tool as a resource from any page containing relevant content. To test comprehension of the content on the page, one can click on the BioCredits link (bottom right of figure).

Figure 8:
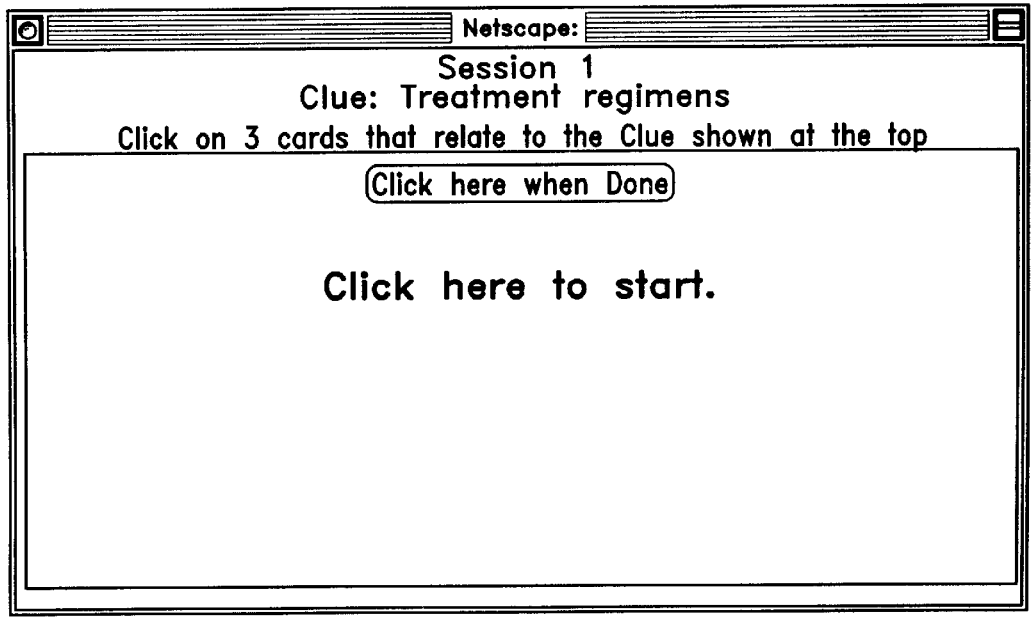
FIG. 8 illustrates the opening of the assessment module in a new window.

FIG. 8 illustrates the opening of the assessment module in a new window. As this is a timed exercise, the actual test does not begin until the user clicks on the screen. The response does not occur until the module is fully loaded from the server and displayed in the window. This obviates the problem of different loading times resulting in the word cards being visible to users before the timer is on.

Figure 9:
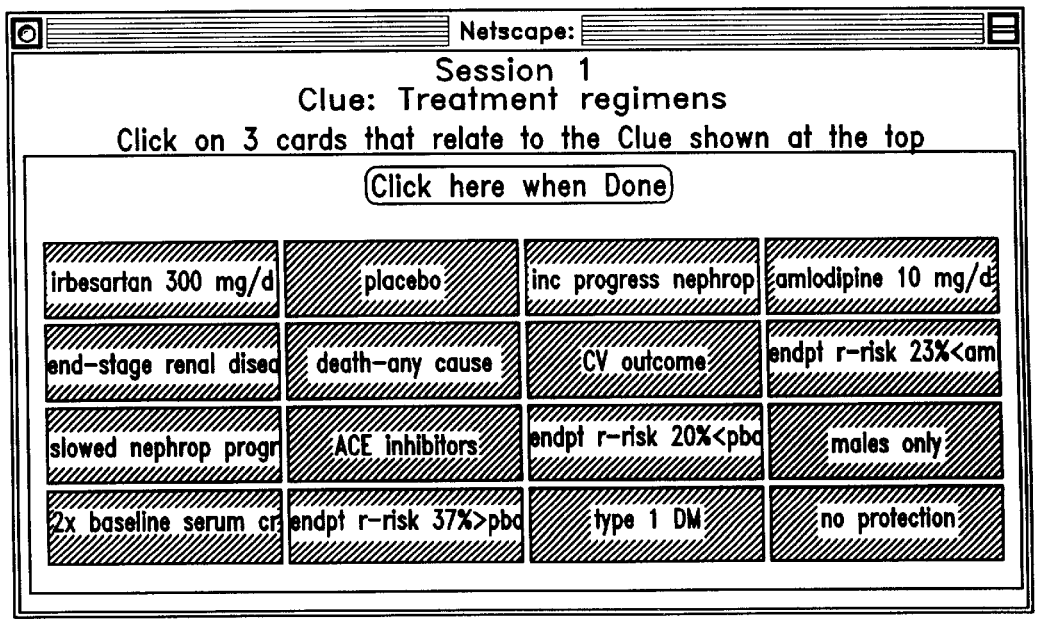
FIG. 9 illustrates the layout of sixteen keyword cards on the screen.

FIG. 9 illustrates the layout of sixteen keyword cards on the screen. A single 'Clue' at the top of the window ties three of the word cards together. The objective is to click on the three correct word cards.

Figures 10, 11:
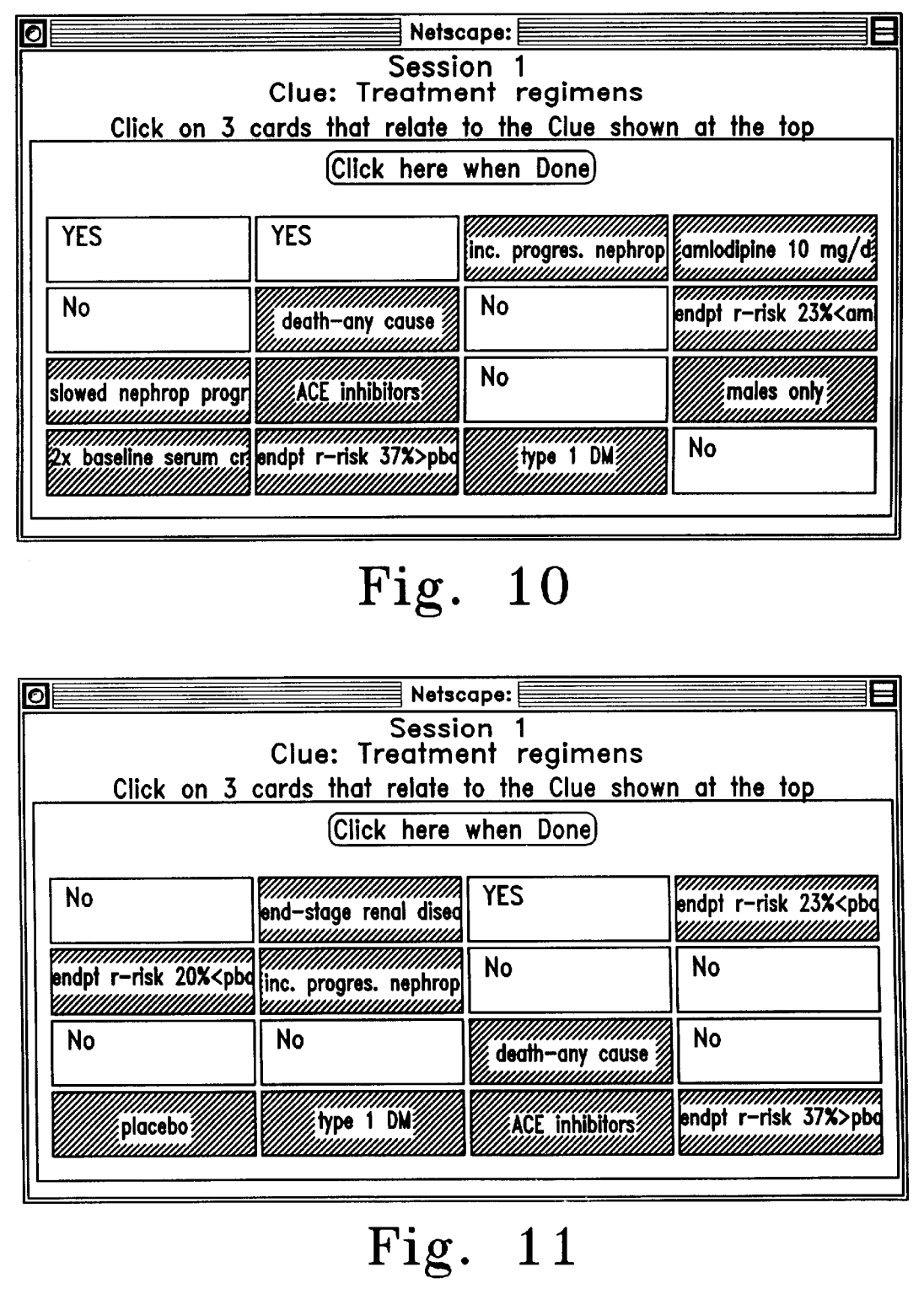

FIG. 10 illustrates the responses to user clicks. When a word card is clicked, it 'turns over' to display either the word 'YES' (if it is one of the three correct word cards) or the word 'NO'. The game is completed when all three 'YES' cards have been revealed.

FIG. 11 illustrates re-use of word cards in subsequent iterations of the module. The same 16 word cards can be shuffled and re-used with each new 'Clue'. Each new clue may link a different set of three word cards.

FIG. 12 illustrates typical navigational options when the assessment is completed and the module window closes. For example, the user may be sent to a screen where Continuing Education credits can be claimed upon the successful conclusion of the assessment activity.

FIG. 13 illustrates the creation of an assessment module. To create an assessment module, a (privileged) user, such as a designated educator, can enter word cards and clues and set the relationships between them. The button at the lower left ('Create') is pressed to submit the form. The server creates the assessment module.

The assessment module illustrated in this example measures relational understandings between three word cards and a clue. This is distinct from traditional methods of online assessment (e.g. multiple-choice tests) which will typically measure linear understandings. Scoring of this assessment module occurs automatically: the server measures the time and the number of clicks until successful completion of the module. It also measures pauses ('thinking time') between clicks. These data can later be used to reconstruct users' learning styles.

One skilled in the art will recognize that variations in the steps, as well as the order of execution, may be done and still make the invention operate in accordance with the features of the invention. Furthermore, one skilled in the art will realize that although the examples described herein generally refer to cards being clicked, other interfaces such as those using voice, touch screen, and the like may also be employed following the operative steps and logic described herein. Manual deployment of the invention described herein may also be employed in accordance with the present invention.

The present invention has been described above in terms of a presently preferred embodiment so that an understanding of the present invention can be conveyed. There are, however, many configurations for interactive assessment systems not specifically described herein but with which the present invention is applicable. The present invention should therefore not be seen as limited to the particular embodiments described herein, but rather, it should be understood that the present invention has wide applicability with respect to interactive assessment methods and systems generally. All modifications, variations, or equivalent arrangements and implementations that are within the scope of the attached claims should therefore be considered within the scope of the invention.

I claim:

1. A computer-implemented method for on-line real-time evaluation of a user's learning style, the method comprising the acts of:

(a) presenting a plurality of interactive assessment exercises to a user wherein each interactive assessment exercise displays a global objective or clue, a number of correct cards displaying distinct textual or graphical content, and a number of incorrect cards displaying distinct textual or graphical content wherein a relationship of content displayed on said cards to said global objective or clue is stronger for correct cards than for incorrect cards and wherein the number of incorrect cards is greater than the number of correct cards;

(b) receiving responses of said user from said plurality of interactive assessment exercises, wherein the user selects at least one card; and (c) evaluating said user's learning style based on search linearity, wherein a linear selection is a selection that results in one coordinate remaining the same between consecutive card selections, and the search linearity is the number of linear selections divided by the total number of cards presented to the user.

2. A computer implemented method for on-line real-time evaluation of a user's learning style, the method comprising the acts of:

(a) presenting a plurality of interactive assessment exercises to a user wherein each interactive assesment exercise display a global objective or clue, a number of correct cards displaying distinct textual or graphical content and a number of incorrect cards displaying distinct textual or graphical content, wherein a relationship of content displayed on said cards to said global objective or clue is stronger for correct cards than for incorrect cards and wherein the number of incorrect cards is greater than the number of incorrect cards;

(b) receiving responses of said user from said plurality of interactive assessment exercises,wherein the user selects at least one card; and (c) evaluating said user's learning style based on search linearity, wherein a linear selection that results in one coordinate remaining the same between consecutive card selections, and the search linearity is the number of linear selections divided by the total number of card selection.

3. The method of claim 2 wherein textual or graphical content on a card can contain one or more keywords, phrases, sentences, Images, symbols, audio clips, video clips, or combinations thereof.

4. An apparatus for evaluating a user's learning style, comprising:

(a) a computer having a server mechanism installed therein for receiving responses from a user, the user supplying responses from a client computer; the server mechanism containing a first logic device for transmitting to the client computer, a plurality of interactive assessment exercises for presentation to the user wherein each interactive assessment exercise displays a global objective or clue, a number of correct cards displaying distinct textual or graphical content, and a number of incorrect cards displaying distinct textual or graphical content, wherein a relationship of content displayed on said cards to said global objective or clue is stronger for correct cards than for incorrect cards and wherein the number of incorrect cards is greater than the number of correct cards;

(b) the server mechanism containing a second logic device for receiving data from the client computer which represent responses from said user from said plurality of interactive assessment exessment wherein the user select at least one card; and (c) a third logic device coupled to the second logic device for evaluating said user's leaning style based on a computation of percentage thinking time, wherein thinking time is defined as a sum time in excess of a predetermined amount of time to complete a single, selection and percentage thinking time is the thinking time for all selections made divided by total time required to successfully complete an assessment exercise.

5. A computer-implemented method for real-time evaluation of a user's learning style, the method comprising the acts of:

(a) presenting a plurality of interactive assessment exercises to a user wherein each interactive assessment exercise displays a global objective or clue, a number of correct cards displaying distinct textual or graphical content, and a number of incorrect cards displaying distinct textual or graphical content, wherein a relationship of content displayed on said cards to said global objective or clue is stronger for correct cards than for incorrect cards and wherein the number of incorrect cards is greater than the number of correct cards;

(b) receiving responses of said user from said plurality of interactive assessment exercises, wherein the user selects at least one card; and (c) evaluating said user's learning style based on a computation of percentage thinking time, wherein thinking time is defined as a sum time in excess of a predetermined amount of time to complete a single selection and percentage thinking time is the thinking time for all selections made divided by total time required to successfully complete an assessment exercise.

* * * * *